United States Patent
Lu et al.

(10) Patent No.: US 6,694,134 B1
(45) Date of Patent: Feb. 17, 2004

(54) TERMINAL DEVICE EMULATOR

(75) Inventors: Priscilla Marilyn Lu, San Carlos, CA (US); Chris P. McIntosh, San Francisco, CA (US)

(73) Assignee: interWAVE Communications International, Ltd., Hamilton (BM)

( * ) Notice: Subject to any disclaimer, the term of this patent is extended or adjusted under 35 U.S.C. 154(b) by 0 days.

(21) Appl. No.: 10/155,931

(22) Filed: May 24, 2002

Related U.S. Application Data

(60) Provisional application No. 60/365,422, filed on Mar. 18, 2002.

(51) Int. Cl.⁷ .................................................. H04M 3/42
(52) U.S. Cl. ..................... 455/419; 455/3.01; 455/3.06; 455/558
(58) Field of Search ................................ 455/3.01, 3.03, 455/3.04, 3.06, 403, 414, 419, 424, 425, 428, 557, 558, 561, 62

(56) References Cited

U.S. PATENT DOCUMENTS

| | | |
|---|---|---|
| 6,130,883 A | 10/2000 | Spear et al. |
| 6,208,724 B1 | 3/2001 | Fritzinger et al. |
| 2001/0016037 A1 | 8/2001 | Fritzinger et al. |
| 2001/0046290 A1 | 11/2001 | Kim |
| 2002/0004411 A1 | 1/2002 | Heppe et al. |
| 2002/0012381 A1 | 1/2002 | Mattisson et al. |
| 2002/0021690 A1 | 2/2002 | Preiss et al. |
| 2002/0052225 A1 | 5/2002 | Davis et al. |

*Primary Examiner*—Cong Van Tran
(74) *Attorney, Agent, or Firm*—Dorsey & Whitney LLP

(57) ABSTRACT

A communication network (100) is provided having a WLAN (112) and an WLAN enabled information processing device (122), such as a portable computer or PDA, capable of emulating a cellular telephone. Generally, the device (122) includes a program (130) to emulate a cellular telephone and to identify voice packets to an access point (114) of the WLAN (112). The access point (114) is configured to route voice packets to a public or private cellular network (104, 110) over a first path (138), and to route other packets to an IP Network (116), over a second path (140). Thus, enabling a user of the device (122) to simultaneously engage in voice communication with a cellular network (104, 110) and data communication with the IP network (116).

31 Claims, 7 Drawing Sheets

TERMINAL DEVICE EMULATOR

CROSS REFERENCE TO RELATED APPLICATIONS

The present application claims priority from commonly assigned, co-pending U.S. Provisional Patent Application Serial No. 60/365,422, entitled Terminal Device Emulator, and filed Mar. 18, 2002, which is incorporated herein by reference.

FIELD

The present invention relates generally to communication networks, and more particularly to a communication network, computer program and method for enabling a wireless enabled information processing device, such as a portable computer or personal digital assistant, to emulate a cellular communications terminal, such as a GSM (Global System for Mobile communications) or 3G (third generation) cellular telephone.

BACKGROUND

The use of wireless communication networks and devices, including cellular telephones and portable computers or network access appliances, has increased exponentially in recent years. Many individuals now carry a cellular telephone, and a portable computer or a similar information processing device, such as a laptop computer, notebook computer or personal digital assistant (PDA), adapted to access a wireless local area network (WLAN) or the Internet via a radio link. Maintaining and carrying two devices that perform essentially the same function, i.e., provide wireless access to a communication network, presents a number of difficulties or disadvantages. First is the expense associated with purchasing the two separate devices, and the expense associated with subscribing to separate services for both devices. There is also the weight or bulk of the devices themselves. Although cellular telephones and portable computers or PDAs are decreasing in size, they are still somewhat bulky.

One possible solution to the above problem is a combination portable computer/telephone having dual radio functionality, including a first radio, such as a radio compatible with one or more high performance wireless communication standards, including, for example, Institute of Electrical and Electronics Engineers 802. 11, high performance local area network (HiperLAN) or Bluetooth, for accessing a computer network, and a second GSM or 3G radio transceiver for accessing a cellular network. However, this approach is not wholly satisfactory for a number of reasons. First the integration of two radios into a single combination device adds to the complexity of the device and therefore would probably not result in substantial savings in cost or weight. In fact, the integration of two radios in a single device, would necessarily require additional components, thereby adding to the cost and complexity of the devices. Moreover, because the two radios operate in vastly different frequency ranges, it is not necessarily the case that a single service provider would be able to provide service in both bands, and therefore there may not be any savings in operating or service costs.

There is yet another problem with conventional cellular telephones and with the above combination device. Wide spread use of cellular telephones, particularly in urban areas and along major travel corridors has led to an overload condition with congestion in the available licensed frequency bands oftentimes resulting in delays, denial of services, and degraded service.

Another approach to solving the above problems is the use of voice over an Internet Protocol network (VoIP) with a WLAN. In this approach voice information is 'packetized' and transmitted from a portable computer or wireless device to an access point connected to a wired local area network or the Internet. This approach is also not wholly satisfactory for a number of reasons. First, the portable computer lacks the ability to provide many of the services commonly expected with cellular telephones, including supplementary and value-added services such as call waiting, call-forwarding, call-conferencing and short message service. Second, while this approach might work well for a small, privately owned WLAN, traffic over public IP networks, such as the Internet, which would necessarily interconnect the access points, would likely cause problems with loss of packets, prioritization of packets, delay of packets and errors in packets. This in turn would result in an unacceptably degraded service.

Accordingly, there is a need for an apparatus and method capable of providing both wireless voice and data communication. It is desirable that the apparatus be less expensive, less complex, and weigh less or have less bulk than a separate cellular telephone and portable computer or other information processing device combined. It is also desirable that the apparatus be compatible with standardized private WLANs, and public cellular networks and Internet infrastructures. It is further desirable that the apparatus provide voice communication having a quality of service the same as or superior to that provided by single purpose GSM network or 3G network cellular telephones.

The system and method of the present invention provides these and other advantages over the prior art.

SUMMARY

It is an object of the present invention to provide a communication system or network and method for enabling information processing devices, such as portable computers or personal digital assistants (PDAs), to communicate with telephones of private and public networks via an access point of a wireless local area network (WLAN).

It is a further object of the present invention to provide a client computer program or software capable of being downloaded into an information processing device having access to a WLAN to enable the information processing device to communicate with telephones of private and public networks via the access point of the WLAN.

In one aspect, the invention is directed to an information processing device capable of emulating a cellular communications terminal, such as a cellular telephone. Generally, the information processing device includes: (i) a transceiver capable of communicating with an access point of a WLAN; (ii) a computer readable memory; (iii) a processor capable of executing instructions of a computer program stored in the computer readable memory; and (iv) a computer program stored in the computer readable memory, the computer program having program code for enabling the information processing device to emulate a cellular communications terminal. Generally, the communications terminal emulated is a voice terminal, and the computer program further includes program code for marking or identifying packets containing voice information or voice packets to the access point. Preferably, the computer program further includes program code to enable the information processing device to emulate any one of a number of different telephones including: CDMA telephones; Global System for Mobile communications (GSM) cellular telephones; and third generation (3G) cellular telephones. More preferably, the computer program further includes program code to enable the information processing device to emulate a particular model of cellular telephone manufactured by a particular manufacturer.

In one embodiment, the information processing device further includes a subscriber identity module (SIM) card and an adapter that enables it to communicate with and function in a public or private cellular network. Alternatively, the information processing device further includes at least one virtual identity module with subscriber identification and security information stored in the computer readable memory to enable it to communicate with and function in a public or private cellular network.

In another embodiment, the computer program includes program code to enable the information processing device to control supplementary services and/or value added services provided by the public network or private network. Supplementary services controlled by the computer program can include: Voice Group Call Service; Voice Broadcast Service; Service definition Line Identification Supplementary Services; Call Forwarding Supplementary Services; Call Waiting and Call Hold Supplementary Services; Multiparty call conferencing; Closed User Group Supplementary Services; Advice of Charge Supplementary Services; Call Barring Supplementary Services; Unstructured Supplementary Service Data; Explicit Call Transfer; Completion of Calls to Busy Subscriber; Short Message Service; and Follow Me. Value-added services controlled by the computer program can include e-mail, calender, and wireless inventory.

In another aspect, the invention is directed to a communication network capable of operating with the information processing device configured and enabled as described above. Generally, the communication network further includes a public network having a public wireless network, and a private network having a switch through which the private network is coupled to the public network, and a WLAN with at least one access point.

Preferably, the WLAN is further coupled to an internet protocol (IP) network, and the access point further includes a computer readable memory; a processor capable of executing instructions of a computer program stored in the computer readable memory; and a packet routing program stored in the computer readable memory. The packet routing program includes program code to enable the access point to route voice packets to the switch over a first communication path, and packets not identified as voice packets to the IP network over a second communications path. Thus, enabling a user of the information processing device to simultaneously engage in voice communication with a terminal coupled to the public network, and data communication with a terminal coupled to the IP network. More preferably, the switch further includes a computer readable memory; a processor capable of executing instructions of a computer program stored in the computer readable memory; and a converter program stored in the computer readable memory to enable the switch to convert voice packets received from the information processing device to signals compatible with those used in the public network. In one version of this embodiment, the switch is a part of a private cellular network. Optionally, the public network further includes a public switched telephone network (PSTN), the private network further includes a private branch exchange (PBX), and the terminal emulator program, packet routing program and converter program are adapted to enable the information processing device to communicate with telephones coupled to the private cellular network, the PBX, the PSTN, and the public cellular network.

In yet another aspect, the invention is directed to a computer program product for use in conjunction with a WLAN enabled information processing device. Generally, the computer program is a terminal emulator program for enabling the information processing device to emulate a cellular communication terminal, and includes program code for: (i) emulating a telephone-type keypad; (ii) taking in information from the keypad; (iii) encapsulating information from the keypad into packets compatible with the access point of the WLAN; (iv) transmitting packets to establish a session with the access point; (v) taking in an audible signal or voice information from a microphone in or connected to the information processing device; (vi) encapsulating the voice information from the microphone into packets containing voice information or voice packets compatible with the access point of the WLAN; (vii) transmitting the voice packets to the access point; (viii) converting the voice packets received in the access point in to packets or signals compatible with the public or private wireless networks; (ix) receiving voice packets from the access point; and (x) converting the received voice packets into an audible signal or voice information to engage in voice communication with a telephone coupled to the private or public network.

In one embodiment, the program code for emulating a telephone-type keypad includes program code for emulating one or more different models of GSM, 3G, or CDMA cellular telephones produced by one or more different manufacturers. In one version of this embodiment, the type, manufacturer and model of the cellular telephone emulated is based on information stored in the VIM or SIM associated with the information processing device.

In still another aspect, the invention is directed to a computer program product for use in conjunction with a WLAN enabled information processing device. Generally, the computer program product includes a computer readable storage medium and a computer program mechanism embedded therein. The computer program mechanism has a program module that directs the information processing device, to function in a specified manner, to emulate a cellular communications terminal. The program module includes program code for: (i) emulating a telephone-type keypad; (ii) taking in information from the keypad; (iii) encapsulating information from the keypad into packets compatible with the access point of the WLAN; (iv) transmitting packets to establish a session with the access point; (v) taking in an audible signal or voice information from a microphone in or connected to the information processing device; (vi) encapsulating the voice information from the microphone into packets containing voice information or voice packets compatible with the access point of the WLAN; (vii) transmitting the voice packets to the access point; (viii) converting the voice packets received in the access point in to packets or signals compatible with the public network or private network; (ix) receiving voice packets from the access point; and (ix) converting the received voice packets into an audible signal or voice information to engage in voice communication with a telephone coupled to the private or public network.

In still another aspect, the invention is directed to a method of adapting a WLAN enabled device to emulate a cellular communications terminal. In the method, a telephone-type keypad is emulated on the information processing device and information taken in from the keypad.

Information from the keypad is then encapsulated into packets compatible with the access point of the WLAN, and packets transmitted to establish a session with the access point or WLAN. An audible signal or voice information is taken in from a microphone integrated with or connected to the information processing device, and the voice information from the microphone encapsulated into packets or voice packets compatible with the access point of the WLAN. The voice packets are then transmitted to the access point. Voice packets from the access point are received and converted into an audible signal or voice information, thereby enabling the user to engage in voice communication with a telephone coupled to a private wireless network coupled to the WLAN.

Advantages of the apparatus and method of the present invention include any or all of the following:
(i) the ability to provide both wireless voice and data communication to a portable computer or PDA simultaneously;
(ii) less expensive, less complex, and lower weight or bulk than separate cellular telephone and portable computer combined;
(iii) compatible with standardized public network and Internet network infrastructures;
(iv) voice communication having a quality of service the same as or superior to that provided by single purpose GSM or 3G cellular telephones; and
(v) ability to provide high-speed high-bandwidth broadband connection to an existing public wireless network using WLAN technology.

BRIEF DESCRIPTION OF THE FIGURES

These and various other features and advantages of the present invention will be apparent upon reading of the following detailed description in conjunction with the accompanying drawings, where.

DETAILED DESCRIPTION

The present invention is directed to a communication network and method for enabling information processing devices to communicate with telephones of private and public networks via an access point of a wireless local area network (WLAN).

A communication network according to the present invention will now be described with reference to FIG. 1. For purposes of clarity, many of the details of communication networks, and in particular of the interconnections between public and private wireless networks and wired networks, that are widely known and are not relevant to the present invention have been omitted.

Figure 1:
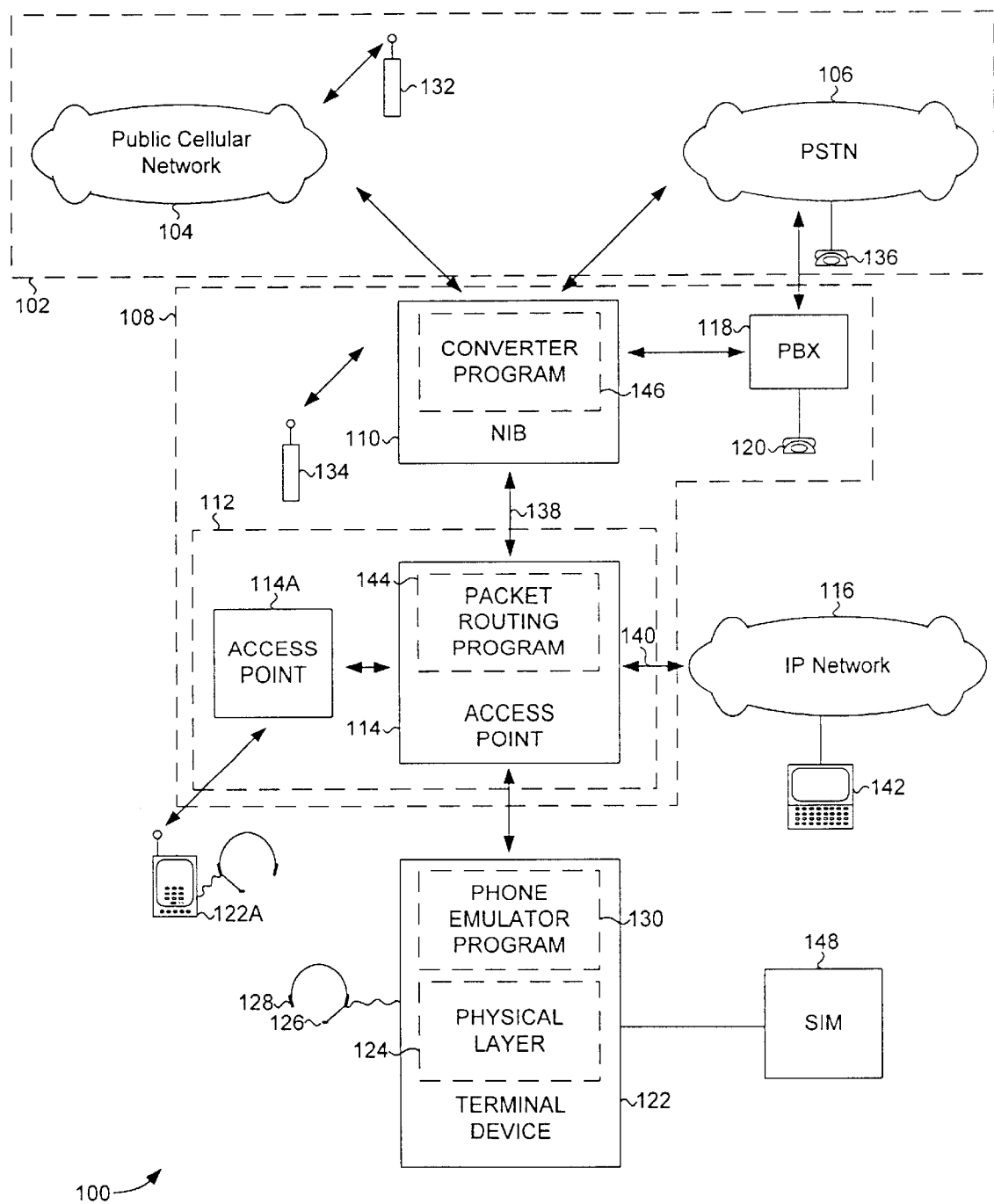
FIG. 1 is a simplified block diagram of a communication network according to an embodiment of the present invention.

FIG. 1 is a simplified block diagram of a communication network according to an embodiment of the present invention. Referring to FIG. 1, the communication network 100 includes a public network 102 having a public wireless or cellular network 104 and a public switched telephone network (PSTN 106), and a private network 108. The private network 108 generally includes a private wireless or cellular network 110, coupled to the public network 102, and a WLAN 112. In one embodiment, the private cellular network 110 includes at least one WAVEXchange™ (WXC) or a Network-In-A-Box™ (NIB) commercially available from interWAVE Communications Inc., of Menlo Park, Calif. A WXC generally includes a mobile services switching centers (MSC), a built-in Visitor Location Registry (VLR)/Home Location Registry (HLR). A NIB can have a MSC, a Base Station Controller (BSC) and a Base Transceiver Station (BTS) in a single enclosure. The WLAN 112 generally includes one or more access points 114, 114A, coupled to one another, to an Internet protocol (IP) network 116, such as the Internet, and, in accordance with the present invention, to the private cellular network 110. Optionally, the private network 108 further includes a private branch exchange (PBX 118) coupled to the WLAN 110 and/or to the PSTN 106, and having a number of PBX telephones 120 connected thereto.

A number of WLAN enabled information processing devices 122, 122A, couple via a radio frequency (RF) link to the access points 114, 114A. The information processing device 122 can be any commercially available portable computer or personal digital assistant (PDA) capable of accessing a WLAN 112 compatible with a number of different communication standards including: IEEE 802.11 or 802.11, and European Telecommunications Standards Institute (ETSI) Broadband Radio Access Networks (BRAN) standards, such as High Performance Local Area Network (HiperLAN/1) and HiperLAN/2. Generally, the information processing device 122 includes a physical layer 124 having: (i) a transceiver (not shown) capable of communicating with the access points 114, 114A, of the WLAN 112; (ii) a computer readable memory (not shown); and (iii) a processor (not shown) capable of executing instructions of computer programs stored in the computer readable memory.

In accordance with the present invention, the information processing device 122 further includes a microphone 126 for receiving an audible signal or voice, a speaker or headphones 128 for transmitting or outputting an audible signal or voice, and a computer program or terminal emulator program 130 that enables the information processing device to emulate a communication terminal. The emulator program 130 enables the information processing device 122 to communicate via an access point 114 of the WLAN 112 with telephones or communication terminals coupled to the public cellular network 104, such as a mobile station (MS) 132, with terminals coupled to the private cellular network 110, such as MS 134, with terminals coupled to the PSTN 106, such as telephone 136, and/or with terminals coupled to the PBX 118, such as PBX telephone 120.

The emulator program 130 includes program code for marking or identifying voice packets to the access point 114. By voice packets it is meant any packets containing voice information or information for supporting voice communication with the public network 102, including the public cellular network 104 and the PSTN 106, and/or the private network 108, including the private cellular network 110 and the PBX 118. The access point 114 is configured to route voice packets to the private cellular network 110 over a first communication path 138, and to route packets not identified as voice packets, to the IP network 116 over a second communications path 140. Thus, the communication system 100 of the present invention enables a user of the information processing device 122 to simultaneously engage in voice communication with a communication terminal or telephone 120, 132, 134, 136, over or though the first communication path 138, and to engage in data communication with a computer terminal 142 or server coupled to the IP network 116 over the second communications path 140.

Generally, the terminal emulator program 130 further includes program code for: (i) emulating a telephone-type keypad; (ii) taking in information from the keypad; (iii) encapsulating information from the keypad into packets compatible with the access point 114 of the WLAN 112; (iv) transmitting packets to establish a session with the access point; (v) taking in an audible signal or voice information from the microphone 126 in or connected to the information processing device 122; (vi) encapsulating the voice information from the microphone into packets containing voice information or voice packets compatible with the access point 114 of the WLAN 112; (vii) transmitting the voice packets to the access point 114; (viii) receiving voice packets from the access point 114; and (ix) converting the received voice packets into an audible signal or voice information to engage in voice communication with a telephone 120, 132, 134, 136, coupled to the public or private network 102, 108.

Preferably, the emulator program 130 further includes program code to enable the information processing device 122 to emulate a particular type of communication device or terminal, such as a cellular telephone, a GSM cellular telephone, a 3G cellular telephone, CDMA telephone or a PSTN telephone. More preferably, the emulator program 130 also includes program code to enable the information processing device 122 to graphically and logically emulate one or more different models of telephones produced by one or more different manufacturers. This is especially desirable where the user of the information processing device 122 is accustomed to a particular model of telephone, or wishes to access and control supplementary and/or value added services provided by service provider, as explained below.

In one embodiment, the access point 114 further includes: (i) a computer readable memory (not shown); (ii) a processor (not shown) capable of executing instructions of a computer program stored in the computer readable memory; and (iii) a packet routing program 144 stored in the computer readable memory. The routing program 144 includes program code for enabling the access point to route voice packets to the private cellular network 110 over the first communication path 138, and packets not identified as voice packets to the IP network 116, over the second communications path 140.

Generally, the private cellular network 110 also includes a computer readable memory (not shown); a processor (not shown) capable of executing instructions of a computer program stored in the computer readable memory; and a converter program 146 stored in the computer readable memory. The converter program 146 includes program code for converting packets from the access point 114 to clear channel signals compatible with those used in the public cellular network 104, the PSTN 106 and/or the PBX 118.

Figure 2:
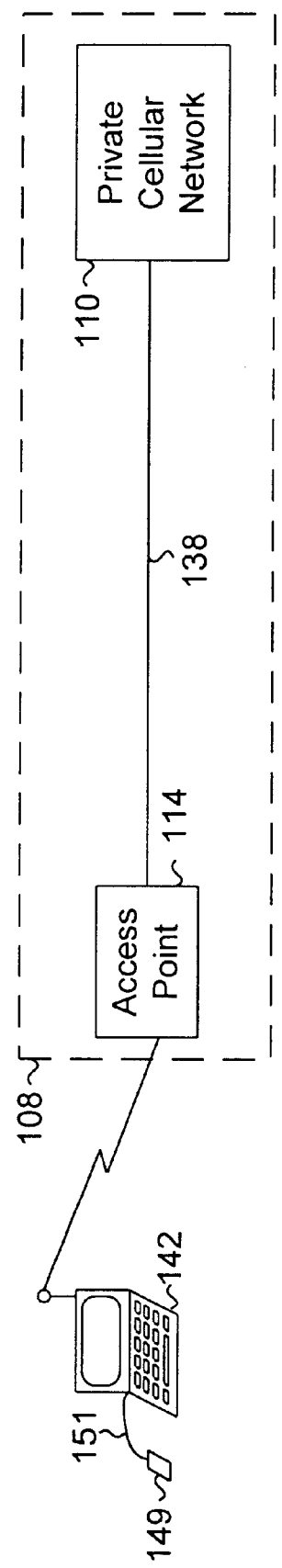
FIG. 2 is a block diagram of a portion of the communication system of FIG. 1 illustrating an access point and an information processing device a card holder/reader coupled thereto.

In another embodiment, the information processing device 122 further includes or is coupled to a subscriber identity module (SIM 148) having an algorithm and a key to support authentication and encryption necessary to enable or facilitate communication with the public network 102, the private cellular network 110 and/or the PBX 118. In one version of this embodiment, the information processing device 122 includes or is coupled a card holder/reader with one or more GSM-type SIM cards or 3G-type universal SIM (SIM) cards (not shown) held in the card holder/reader. Each SIM or SIM card has stored therein subscriber identification and security information for one or more user profiles. There are two different ways of coupling the card holder/reader to the information processing device 122, including: (i) use of a universal serial bus (USB) adapter or card holder/reader 149 that enables the information processing device to communicate with a GSM-type SIM card or a 3G-type USIM card via a USB bus 151, as shown in FIG. 2; or (ii) use of a PCMCIA adapter (not shown) that enables the information processing device to communicate directly with a GSM-type SIM card.

Alternatively, the SIM 148 encompasses subscriber identification and security information stored in the memory system of the information processing device 122A. This latter version has the advantage of enabling the SIM to be downloaded from the WLAN 112 along with computer software or the emulator program 130 that enable the information processing device 122A to emulate or function as a communication terminal or telephone.

Figure 3:
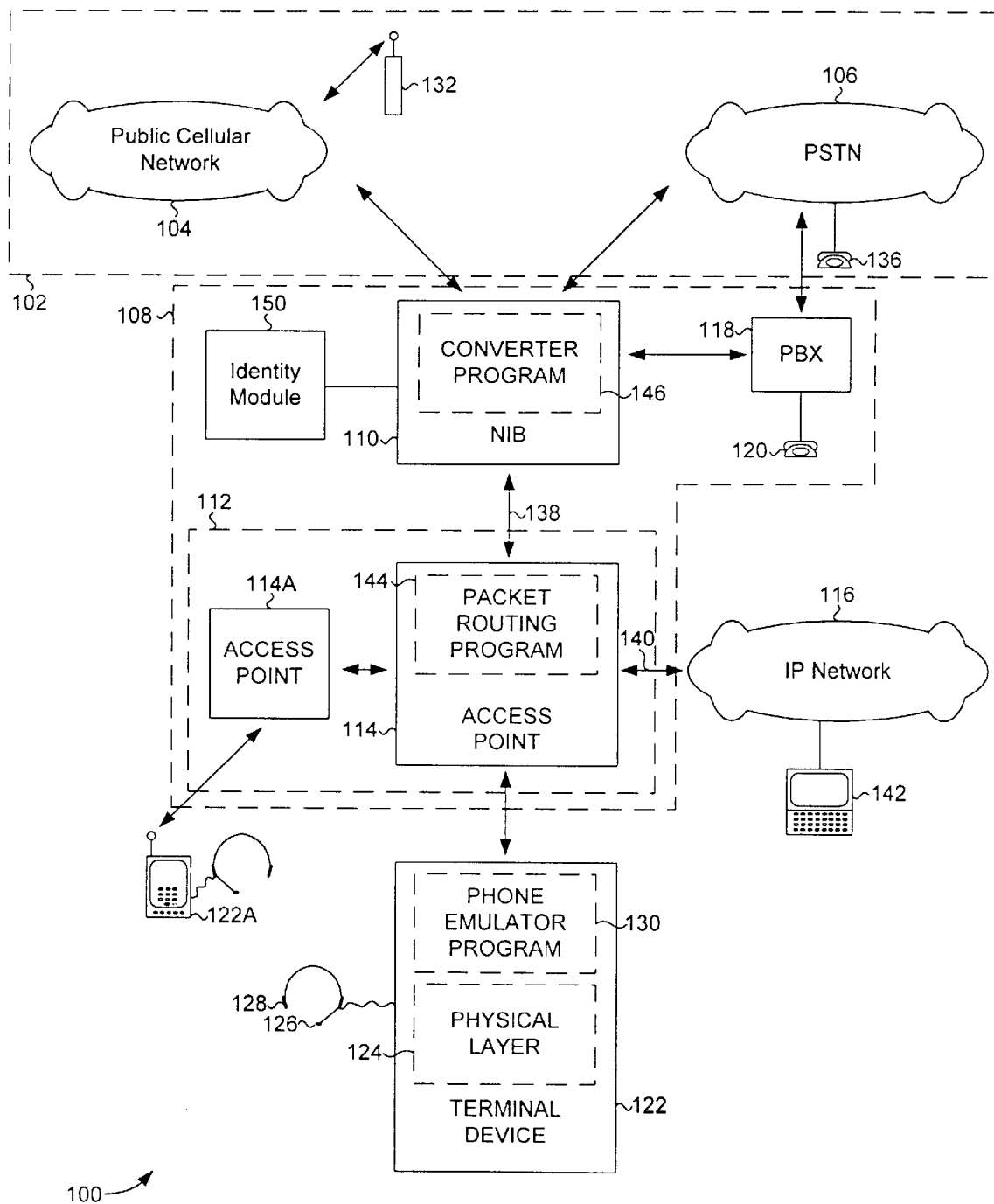
FIG. 3 is a simplified block diagram of a communication network according to another embodiment of the present invention having an identity module coupled to a private cellular network.

In yet another embodiment, shown in FIG. 3, the private network 108 further includes an identity module 150 coupled to the private cellular network 110, and having at least one identifier or virtual identifier stored therein that can be permanently or temporarily associated with one or more information processing devices 122, to enable the information processing device to communicate with the public network 102 and/or the private cellular network 108 via the WLAN 112. Identity modules and virtual identifiers and described in greater detail in commonly assigned, co-pending U.S. patent application Ser. No. 10/002,551, filed Nov. 1, 2001, which is incorporated herein by reference. Generally, the virtual identifiers include algorithms and a key to support authentication and encryption necessary to facilitate communication with the public network 102 or private cellular network 108. In one version of this embodiment, the identity module 150 includes subscriber identification and security information stored in a memory system (not shown) coupled to the private cellular network 108. Alternatively, the identity module includes a card holder/reader (not shown), as described above, and the virtual identifiers include one or more GSM-type SIM cards or 3G-type USIM cards held in the card holder/reader, as described above.

The virtual identifiers can be associated with the information processing devices 122 on a one-to-one basis; on a one-to-many basis; or on a many-to-many basis in which the virtual identifiers are maintained as a pool of virtual identifiers that are associated temporarily with a information processing device on an as needed basis. Alternatively, the virtual identifiers can be associated with the information processing, devices 122 on a many-to-one basis to provide a single information processing device with multiple different user profiles that can be selected by a user for record or billing purposes. For example, a user placing a call from a information processing device 122 over the public cellular network 104 could enter a first code selecting a first user profile when the call is for business purposes, and a second when the call is for private purposes. In addition, the communication system 100 or the user can select a GSM-type SIM when the communication is over a GSM cellular network, and a 3G-type USIM when it is connected or routed over a 3G cellular network.

Preferably, the SIM 148 or identity module 150, and computer software or emulator programs 130 in the information processing device 122 that allow it to emulate a communication terminal, also includes program code to enable the information processing device to interface with and control or access supplementary and/or value-added services provided by the private cellular network 108 and/or public network 102 service provider. Supplementary services can include, for example, Voice Group Call Service; Voice Broadcast Service; Service definition Line Identification Supplementary Services; Call Forwarding Supplementary Services; Call Waiting and Call Hold Supplementary Services; multiparty Supplementary Services including call conferencing; Closed User Group Supplementary Services, Advice of Charge Supplementary Services; Call Barring Supplementary Services; Unstructured Supplementary Service Data; Explicit Call Transfer; Completion of Calls to Busy Subscriber; Short Message Service; and Follow Me. Value added services include, for example, e-mail, calender, wireless inventory, etcetera.

Figure 4:
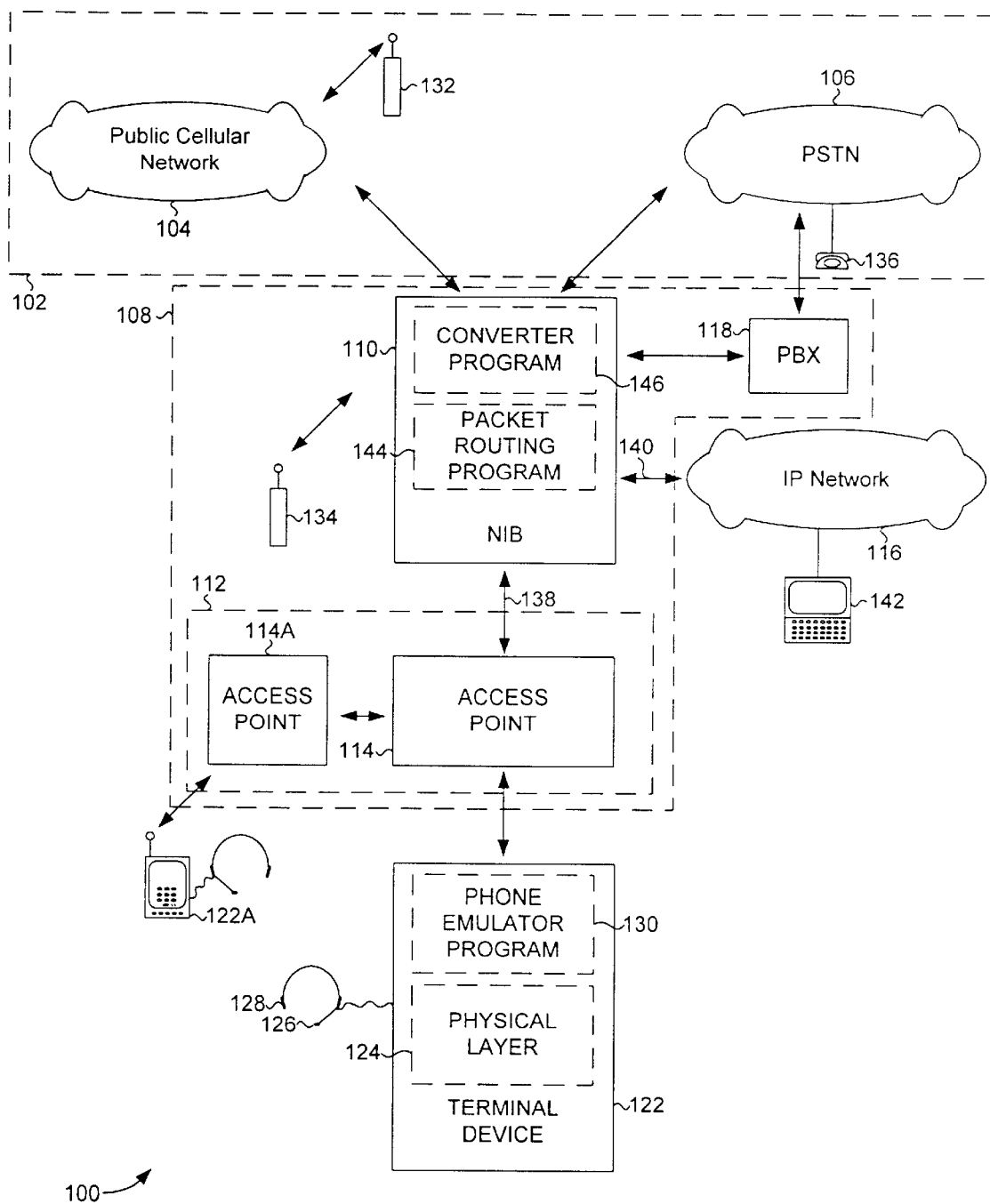
FIG. 4 is a simplified block diagram of a communication network according to another embodiment of the present invention having a routing program and a converter program combined in a private cellular network.

In another embodiment of a communication network 100 according to the present invention, shown in FIG. 4, all packets from the information processing device 122 are routed through the access point 114 and to the private cellular network 110. In this embodiment, the WLAN 112 couples to the IP network 116 or Internet through the private cellular network 110, and the packet routing program 144 is combined with the converter program 146 in the private cellular network.

Figure 5:
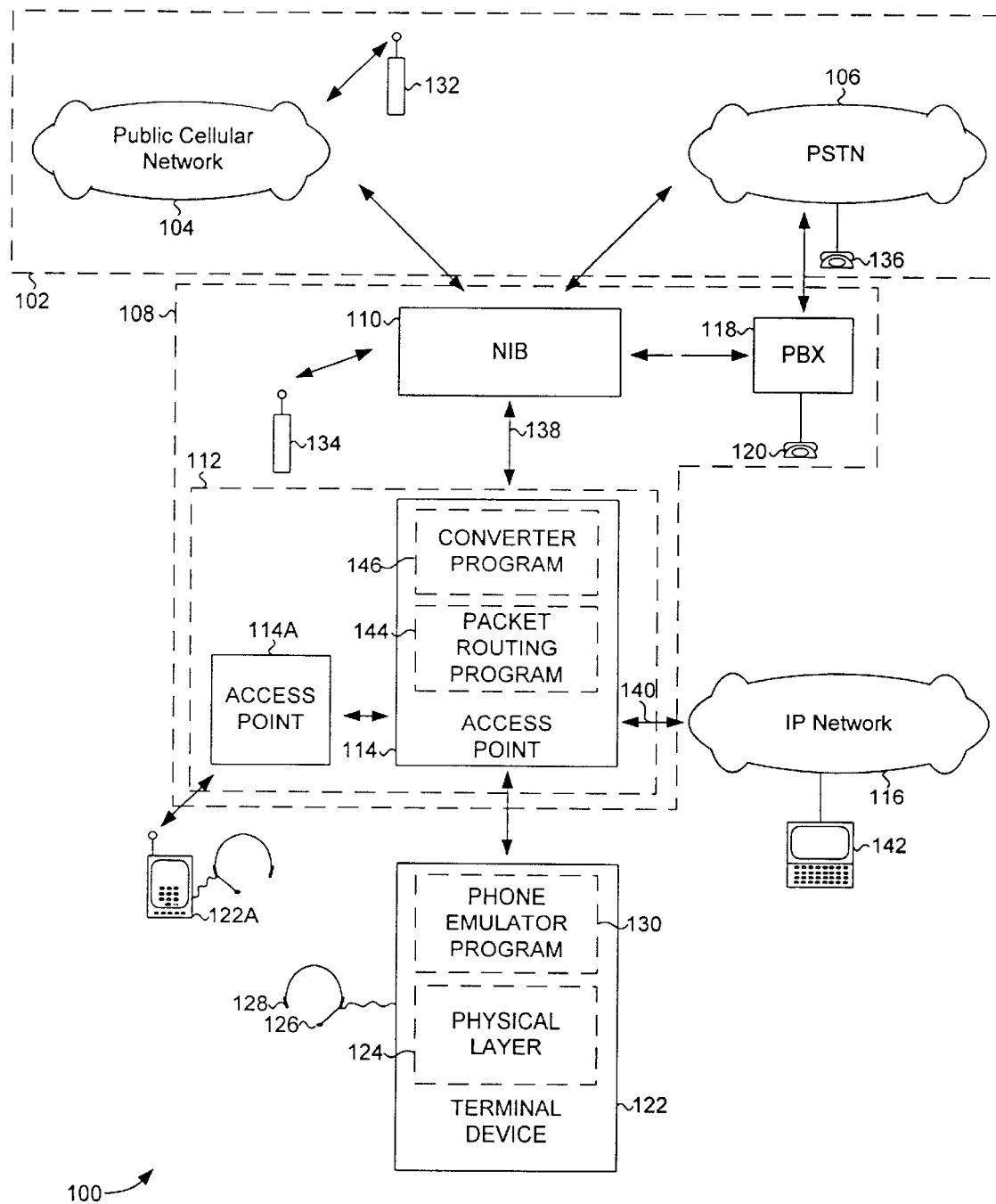
FIG. 5 is a simplified block diagram of a communication network according to yet another embodiment of the present invention having a routing program and a converter program combined in an access point.

In another embodiment of a communication network 100 according to of the present invention, shown in FIG. 5, the converter program 146 is combined with the packet routing program 144 in the access point 114.

Figure 6:
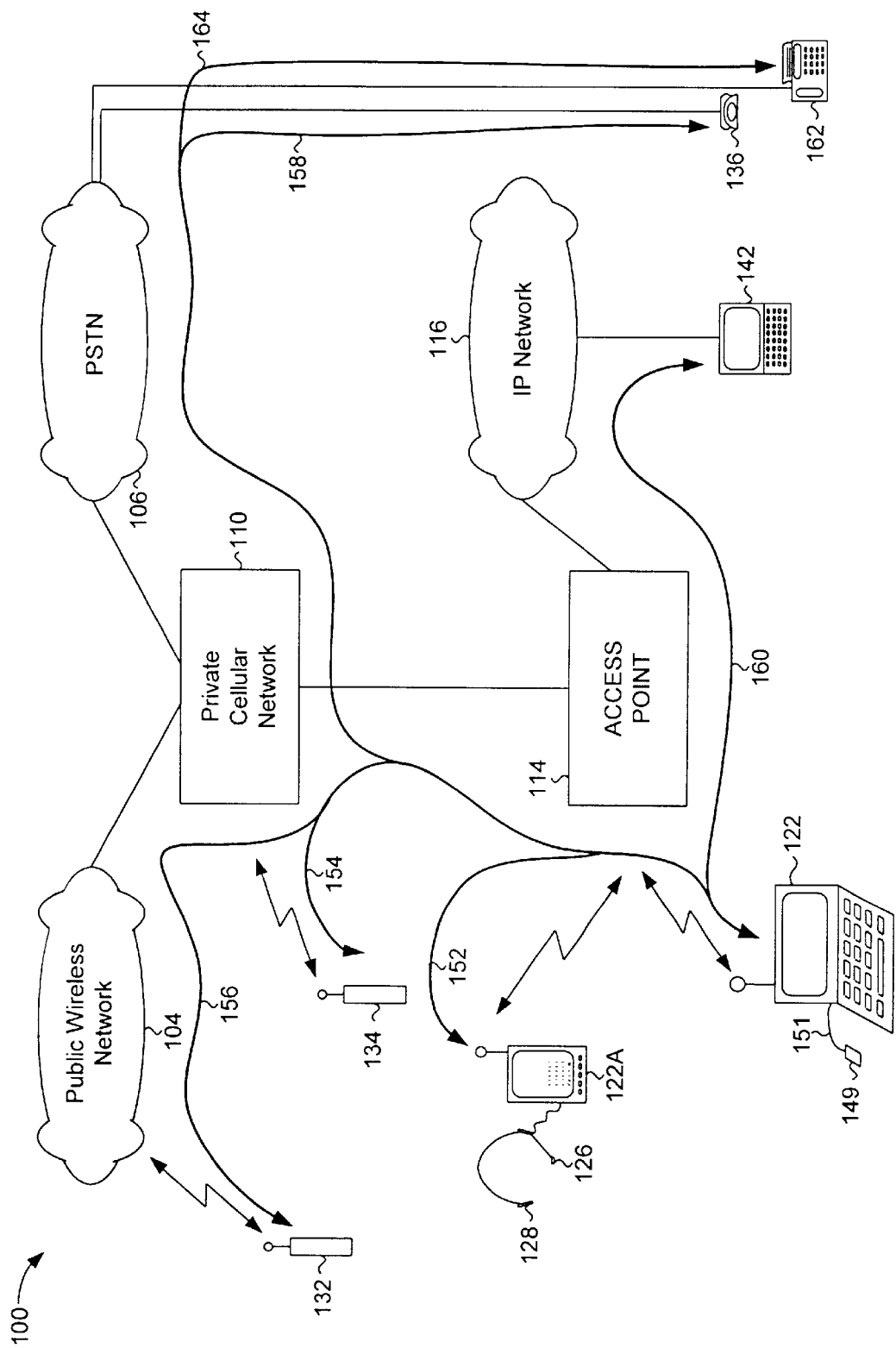
FIG. 6 is a block diagram of a communication network various call paths between an information processing device and telephones coupled to private and public networks according to an embodiment of the present invention.

FIG. 6 is a block diagram of a communication network various call paths between an information processing device 122 and telephones 120, 132, 134, 136, coupled to the public and private networks 102, 108, according to an embodiment of the present invention. Referring to FIG. 6, it is seen that voice communication can be routed between two information processing devices 122, 122A, along call path 152, and between the information processing device 122 and a telephone 134 coupled to the private cellular network 110 along call path 154. Voice communication can also be routed between the information processing device 122 and a telephone 132 coupled to the public cellular network 104 along call path 156, and between the information processing device and a telephone 136 coupled to the PSTN 106 along call path 158. Simultaneously, the information processing device 122 can be communicating with the computer terminal 142 via the IP Network 116 along call path 160, and with a fax machine 162 coupled to the PSTN 106 along call path 164.

Figure 7:
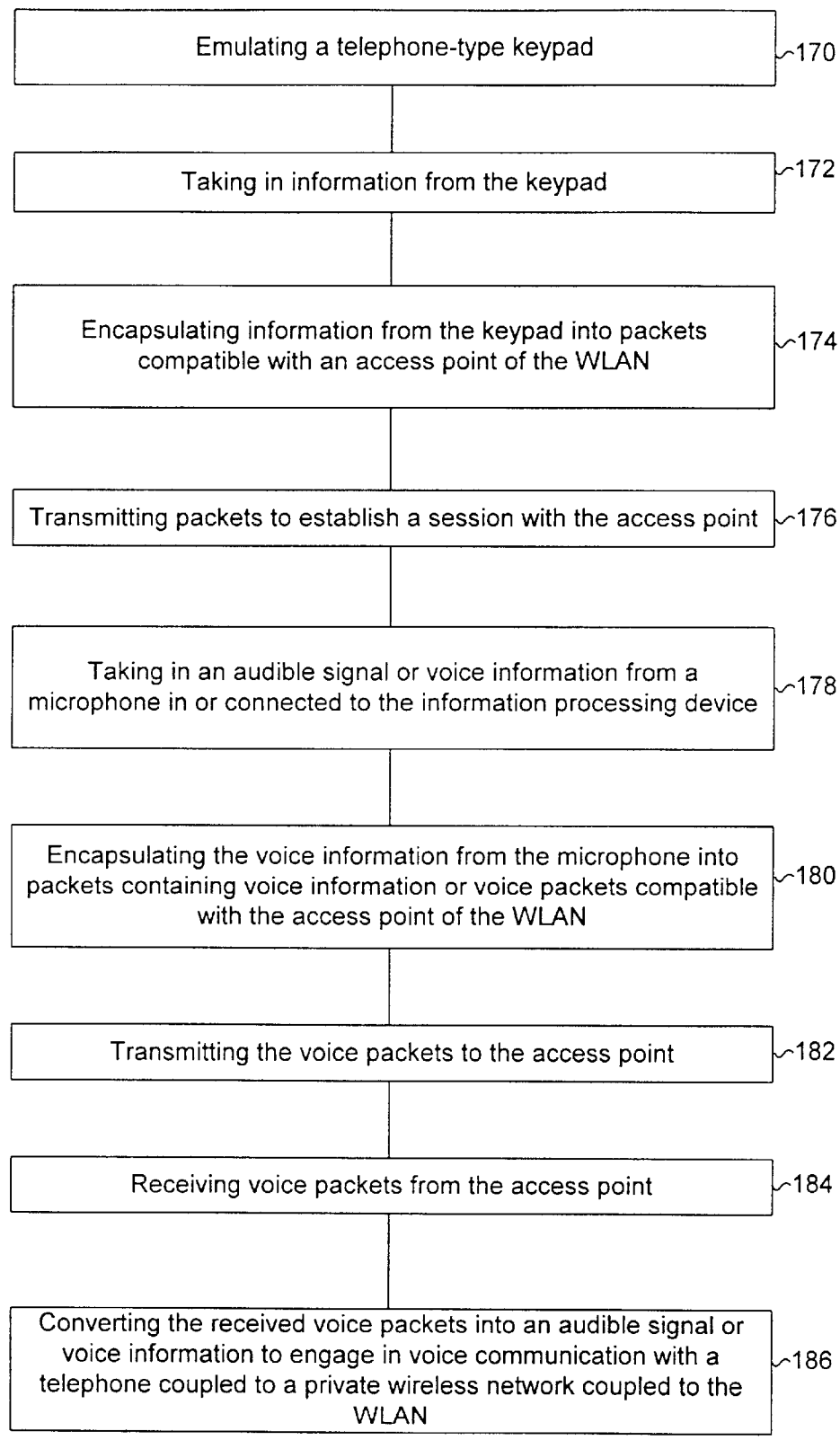
FIG. 7 is a flowchart showing an embodiment of a process for enabling information processing devices to communicate with private and public networks via a WLAN according to an embodiment of the present invention.

A method or process for enabling information processing devices 122 to communicate with private and public networks 108, 102 via a WLAN 112 will now be described with reference to FIG. 7. FIG. 7 is a flowchart showing an embodiment of a process for enabling information processing devices to communicate with private and public networks via a WLAN according to an embodiment of the present invention. Generally, in the method a telephone-type keypad is emulated on the information processing device (step 170) and information taken in from the keypad (step 172). Information from the keypad is then encapsulated into packets compatible with the access point of the WLAN (step 177), and packets transmitted to establish a session with the access point or WLAN (step 176). An audible signal or voice information is taken in from a microphone integrated with or connected to the information processing device (step 178), and the voice information from the microphone encapsulated into packets or voice packets compatible with the access point of the WLAN (step 180). The voice packets are then transmitted to the access point (step 182). Voice packets from the access point are received (step 184) and converted into an audible signal or voice information (step 186), thereby enabling the user to engage in voice communication with a telephone coupled to a private wireless network coupled to the WLAN.

In the preferred embodiment, the emulator program 130 is downloaded from the private or public network 108, 102, the first time the information processing device 122 accesses them.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best use the invention and various embodiments with various modifications as are suited to the particular use contemplated. It is intended that the scope of the invention be defined by the claims appended hereto and their equivalents.

We claim:

1. An information processing device having:
   a transceiver capable of communicating with an access point of a wireless local area network (WLAN);
   a computer readable memory;
   a processor capable of executing instructions of a computer program stored in the computer readable memory; and
   a computer program stored in the computer readable memory for enabling the information processing device to emulate a voice communications terminal, the computer program including program code for enabling the information processing device to take in an audible signal, encapsulate the audible signal into voice packets, and identify voice packets to the access point.

2. An information processing device according to claim 1, wherein the transceiver is compatible with a WLAN communication standard selected from a group consisting of:
   HIgh Performance Local Area Network (HiperLAN/1);
   HIgh Performance Local Area Network (HiperLAN/2); and
   Institute of Electrical and Electronics Engineers 802. 11 (IEEE 802.11).

3. An information processing device according to claim 1, wherein the computer program further includes program code to enable the information processing device to emulate a cellular telephone selected from the group consisting of:
   CDMA telephones;

Global System for Mobile communications (GSM) cellular telephones; and third generation (3G) cellular telephones.

4. An information processing device according to claim 3, wherein the computer program further includes program code to enable the information processing device to emulate a predetermined model of cellular telephone manufactured by a predetermined manufacturer.

5. An information processing device according to claim 1, wherein the computer program further includes program code to enable the information processing device to emulate a cellular telephone and further comprising a subscriber identity module (SIM) card and an adapter that enables the information processing device to communicate with the public cellular network.

6. An information processing device according to claim 1, wherein the computer program further includes program code to enable the information processing device to emulate a cellular telephone, and further comprising at least one virtual identity module including subscriber identification and security information stored in the computer readable memory to enable the information processing device to communicate with the public cellular network.

7. An information processing device according to claim 1, wherein the computer program includes program code to enable the information processing device to control supplementary services provided by the public network or private network.

8. An information processing device according to claim 1, wherein the computer program includes program code to enable the information processing device to control value-added services provided by the public network or private network.

9. An information processing device according to claim 8, wherein the value-added services controlled by the computer program include e-mail, calender, and wireless inventory.

10. A communication network comprising:

a public network including a public cellular network;

a private network including:
  a switch through which the private network is coupled to the public network;
  a wireless local area network (WLAN) having at least one access point; and
  an information processing device having:
    a transceiver capable of communicating with the access point of the WLAN;
    a computer readable memory;
    a processor capable of executing instructions of a computer program stored in the computer readable memory; and
    a terminal emulator program stored in the computer readable memory to enable the information processing device to communicate with the public network, the terminal emulator program including program code to enable the information processing device to:
      emulate a voice communications terminal capable of communicating with the public networks;
      take in an audible signal from a microphone coupled to the information processing device;
      encapsulate the audible signal into voice packets;
      identify the voice packets to the access point;
      transmit the voice packets to the access point;
      receive voice packets from the access point; and
      convert the received voice packets into an audible signal.

11. A communication network according to claim 10, wherein the terminal emulator program includes program code for:

emulating a telephone-type keypad;

taking in information from the keypad;

encapsulating information from the keypad into packets compatible with the access point of the WLAN; and transmitting packets to establish a session with the access point.

12. A communication network according to claim 10, wherein the WLAN is further coupled to an internet protocol (IP) network, and wherein the access point further comprises:

a computer readable memory;

a processor capable of executing instructions of a computer program stored in the computer readable memory; and a packet routing program stored in the computer readable memory including program code to enable the access point to route voice packets to the switch over a first communication path, and packets not identified as voice packets to the IP network over a second communications path, whereby a user of the information processing device can substantially simultaneously engage in voice communication with a terminal coupled to the public network, and data communication with a terminal coupled to the IP network.

13. A communication network according to claim 12, wherein the switch further comprises:

a computer readable memory;

a processor capable of executing instructions of a computer program stored in the computer readable memory; and a converter program stored in the computer readable memory including program code to enable the switch to convert voice packets received from the information processing device to signals compatible with those used in the public network.

14. A communication network according to claim 13, wherein the private network further comprises a private cellular network, and wherein the switch is a part of the private cellular network.

15. A communication network according to claim 14, wherein the private network further comprises a private branch exchange (PBX).

16. A communication network according to claim 15, wherein the public network further comprises a public switched telephone network (PSTN).

17. A communication network according to claim 16, wherein the terminal emulator program, packet routing program and converter program enable the information processing device to communicate with at least one telephone selected from the group of:

telephones coupled to the private cellular network;

telephones coupled to the PBX;

telephones coupled the PSTN; and telephones coupled to the public cellular network.

18. A communication network according to claim 10, wherein the terminal emulator program further includes program code to enable the information processing device to emulate a cellular telephone selected from the group consisting of:

CDMA telephones;

Global System for Mobile communications (GSM) cellular telephones; and third generation (3G) cellular telephones.

19. A communication network according to claim 18, wherein the terminal emulator program further includes program code to enable the information processing device to emulate a predetermined model of cellular telephone manufactured by a predetermined manufacturer.

20. A communication network according to claim 10, wherein the terminal emulator program further includes program code to enable the information processing device to emulate a cellular telephone, and wherein the information processing device further comprises a subscriber identity module (SIM) card and an adapter that enables the information processing device to communicate with a cellular telephone network.

21. A communication network according to claim 10, wherein the terminal emulator program further includes program code to enable the information processing device to emulate a cellular telephone, and wherein the information processing device further comprises at least one virtual identity module including subscriber identification and security information stored in the computer readable memory to enable the information processing device to communicate with a cellular telephone network.

22. A communication network according to claim 10, wherein the terminal emulator program includes program code to enable the information processing device to control supplementary services provided by the public network or private network.

23. A communication network according to claim 10, wherein the terminal emulator program includes program code to enable the information processing device to control value-added services provided by the public network or private network.

24. A communication network according to claim 23, wherein the value-added services controlled by the computer program include e-mail, calender, and wireless inventory.

25. A communication network according to claim 10, wherein the information processing device is a portable computer or personal digital assistant (PDA).

26. A computer program product for use in conjunction with a wireless local area network (WLAN) enabled information processing device, such as a portable computer or personal digital assistant, the computer program product comprising a computer readable storage medium and a computer program mechanism embedded therein, the computer program mechanism, comprising:

a program module that directs the information processing device, to function in a specified manner, to emulate a communications terminal, the program module including program code for:

emulating a telephone-type keypad;
taking in information from the keypad;
encapsulating information from the keypad into packets compatible with an access point of the WLAN;
transmitting packets to establish a session with the access point;
taking in an audible signal from a microphone coupled to the information processing device;
encapsulating the voice information from the microphone into voice packets;
identifying the voice packets to the access point;
transmitting the voice packets to the access point;
receiving voice packets from the access point; and
converting the received voice packets into an audible signal to engage in voice communication with a telephone coupled to a cellular network coupled to the WLAN.

27. A computer program product according to claim 26, wherein the program module further includes program code to enable the information processing device to emulate a cellular telephone selected from the group consisting of:

CDMA telephones;

Global System for Mobile communications (GSM) cellular telephones; and third generation (3G) cellular telephones.

28. A communication network according to claim 27, wherein the program module further includes program code to enable the information processing device to emulate a predetermined model of cellular telephone manufactured by a predetermined manufacturer.

29. A method of adapting a wireless local area network (WLAN) enabled information processing device to emulate a cellular communications terminal, the method comprising steps of:

emulating a telephone-type keypad on the information processing device;

taking in information from the keypad;

encapsulating information from the keypad into packets compatible with an access point of the WLAN;

transmitting packets to establish a session with the access point;

taking in an audible signal from a microphone coupled to the information processing device;

encapsulating the voice information from the microphone into voice packets compatible with the access point of the WLAN;

identifying the voice packets to the access point transmitting the packets and voice packets to the access point;

receiving voice packets from the access point; and converting the received voice packets into an audible signal to engage in voice communication with a telephone coupled to a cellular network coupled to the WLAN.

30. An information processing device having:

a transceiver capable of communicating with an access point of a wireless local area network (WLAN);

a computer readable memory;

a processor capable of executing instructions of a computer program stored in the computer readable memory; and a computer program stored in the computer readable memory for enabling the information processing device to emulate a communications terminal, the computer program including program code for enabling the information processing device to emulate the communications terminal and to control supplementary services provided by the public network or private network, wherein the supplementary services controlled by the computer program include:

Voice Group Call Service;
Voice Broadcast Service;
Service definition Line Identification Supplementary Services;
Call Forwarding Supplementary Services;
Call Waiting and Call Hold Supplementary Services;
Multiparty call conferencing;
Closed User Group Supplementary Services;
Advice of Charge Supplementary Services;
Call Barring Supplementary Services;
Unstructured Supplementary Service Data;

Explicit Call Transfer;
Completion of Calls to Busy Subscriber;
Short Message Service; and
Follow Me.

31. A communication network comprising:
a public network including a public cellular network;
a private network including:
- a switch through which the private network is coupled to the public network;
- a wireless local area network (WLAN) having at least one access point; and
- an information processing device having:
  - a transceiver capable of communicating with the access point of the WLAN;
  - a computer readable memory;
  - a processor capable of executing instructions of a computer program stored in the computer readable memory; and
  - a terminal emulator program stored in the computer readable memory to enable the information processing device to communicate with the public network, the terminal emulator program including program code to enable the information processing device to emulate a communications terminal capable of communicating with the public network and to enable the information processing device to control supplementary services provided by the public network or private network, wherein the supplementary services controlled by the computer program include:
    - Voice Group Call Service;
    - Voice Broadcast Service;
    - Service definition Line Identification Supplementary Services;
    - Call Forwarding Supplementary Services;
    - Call Waiting and Call Hold Supplementary Services;
    - Multiparty call conferencing;
    - Closed User Group Supplementary Services;
    - Advice of Charge Supplementary Services;
    - Call Barring Supplementary Services;
    - Unstructured Supplementary Service-Data;
    - Explicit Call Transfer;
    - Completion of Calls to Busy Subscriber;
    - Short Message Service; and
    - Follow Me.

* * * * *